United States Patent

Kendrick

Patent Number: 5,897,433
Date of Patent: Apr. 27, 1999

[54] FISH SCALING NET

[76] Inventor: Victor Kendrick, 179 Wallingford N. Turnpike Rd., Wallingford, Conn. 06492

[21] Appl. No.: 09/041,426

[22] Filed: Mar. 12, 1998

[51] Int. Cl.⁶ ..................................................... A22C 25/02
[52] U.S. Cl. ............................................................ 452/105
[58] Field of Search ....................................... 452/105, 98

[56] References Cited

U.S. PATENT DOCUMENTS

| | | | |
|---|---|---|---|
| 5,279,257 | 1/1994 | Temby | 119/158 |
| 5,295,771 | 3/1994 | Wehrmann et al. | 408/67 |
| 5,306,201 | 4/1994 | Holyoak | 452/98 |
| 5,318,472 | 6/1994 | Johnson | 452/105 |

Primary Examiner—Willis Little

[57] ABSTRACT

A new fish scaling net for removing scales from fish with ease and without mess. The inventive device includes a frame member including a lower frame member and an upper frame member. The lower frame member has a generally rectangular configuration. The lower frame member includes opposed long side segments and opposed short end segments. Free ends of the side and end segments are adjoined by corner brackets. The upper frame member includes a pair of inverted U-shaped segments. The inverted U-shaped segments each have free ends secured to the corner brackets and generally extend a length of the opposed long side segments. A cover member is coupled over the frame member. The cover member is fabricated of a transparent canvas material. The cover member extends over the inverted U-shaped segments and is tied around the lower frame member leaving an open lower end exposed whereby the frame member can be placed over a sink. The cover member includes a front panel, a back panel, a top panel and opposed side panels. The front panel has a pair of apertures therethrough dimensioned for receiving arms of a user therethrough.

9 Claims, 2 Drawing Sheets

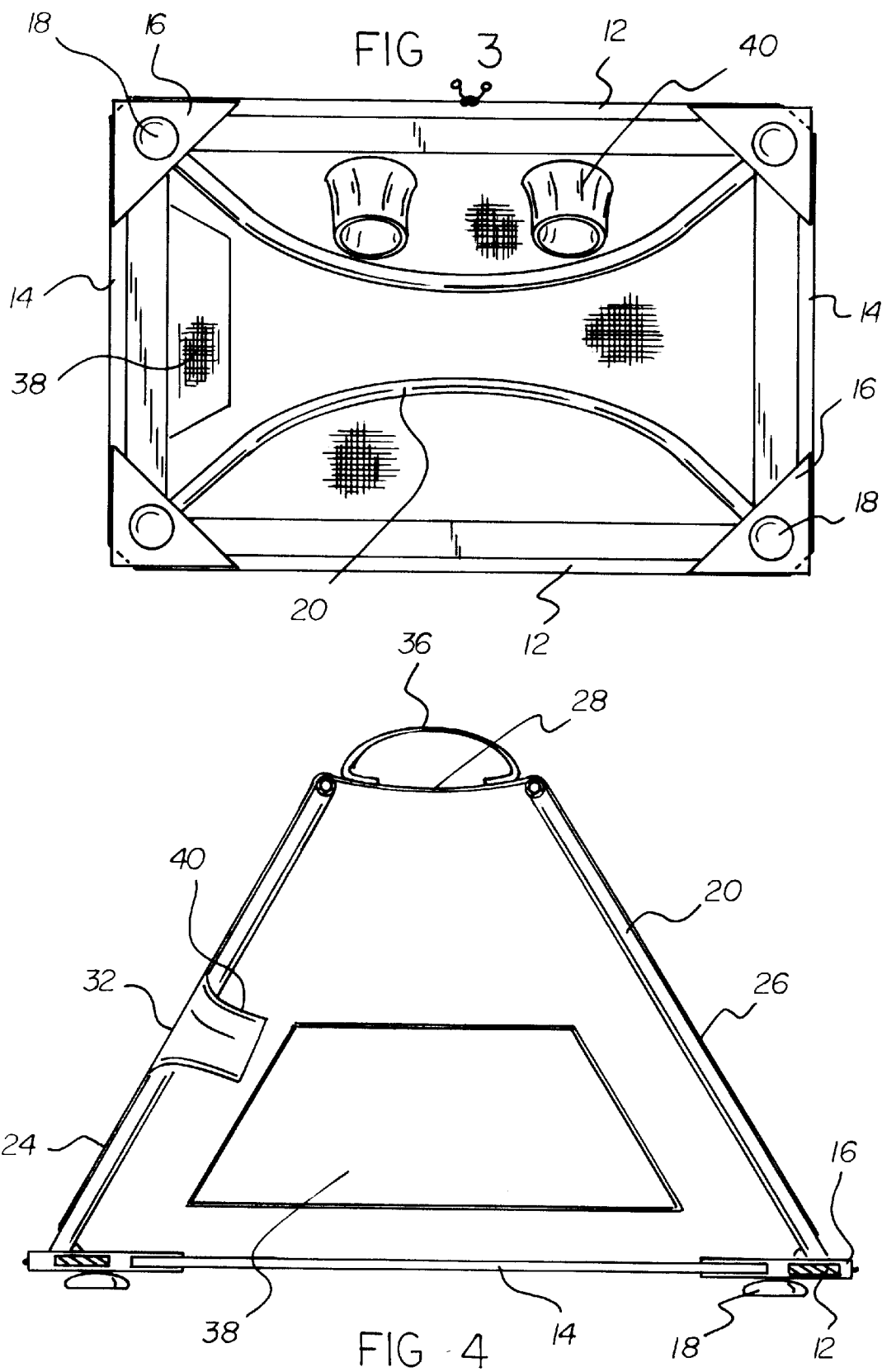

FISH SCALING NET

BACKGROUND OF THE INVENTION

1. Field of the Invention

The present invention relates to restraining nets and more particularly pertains to a new fish scaling net for removing scales from fish with ease and without mess.

2. Description of the Prior Art

The use of restraining nets is known in the prior art. More specifically, restraining nets heretofore devised and utilized are known to consist basically of familiar, expected and obvious structural configurations, notwithstanding the myriad of designs encompassed by the crowded prior art which have been developed for the fulfillment of countless objectives and requirements.

Known prior art restraining nets include U.S. Pat. No. 5,121,843 to Elder; U.S. Pat. No. 4,747,392 to Rogers; U.S. Pat. No. 5,318,472 to Johnson; U.S. Pat. No. 5,016,298 to Ris et al.; U.S. Pat. No. 4,008,510 to Laffin; and U.S. Pat. No. 4,945,608 to Majure et al.

While these devices fulfill their respective, particular objectives and requirements, the aforementioned patents do not disclose a new fish scaling net. The inventive device includes a frame member including a lower frame member and an upper frame member. The lower frame member has a generally rectangular configuration. The lower frame member includes opposed long side segments and opposed short end segments. Free ends of the side and end segments are adjoined by corner brackets. The upper frame member includes a pair of inverted U-shaped segments. The inverted U-shaped segments each have free ends secured to the corner brackets and generally extend a length of the opposed long side segments. A cover member is coupled over the frame member. The cover member is fabricated of a transparent canvas material. The cover member extends over the inverted U-shaped segments and is tied around the lower frame member leaving an open lower end exposed whereby the frame member can be placed over a sink. The cover member includes a front panel, a back panel, a top panel and opposed side panels. The front panel has a pair of apertures therethrough dimensioned for receiving arms of a user therethrough.

In these respects, the fish scaling net according to the present invention substantially departs from the conventional concepts and designs of the prior art, and in so doing provides an apparatus primarily developed for the purpose of removing scales from fish with ease and without mess.

SUMMARY OF THE INVENTION

In view of the foregoing disadvantages inherent in the known types of restraining nets now present in the prior art, the present invention provides a new fish scaling net construction wherein the same can be utilized for removing scales from fish with ease and without mess.

The general purpose of the present invention, which will be described subsequently in greater detail, is to provide a new fish scaling net apparatus and method which has many of the advantages of the restraining nets mentioned heretofore and many novel features that result in a new fish scaling net which is not anticipated, rendered obvious, suggested, or even implied by any of the prior art restraining nets, either alone or in any combination thereof.

To attain this, the present invention generally comprises a frame member including a lower frame member and an upper frame member. The lower frame member has a generally rectangular configuration. The lower frame member includes opposed long side segments and opposed short end segments. Free ends of the side and end segments are adjoined by corner brackets. The corner brackets each have a suction cup disposed on a lower surface thereof. The upper frame member includes a pair of inverted U-shaped segments. The inverted U-shaped segments each have free ends secured to the corner brackets and generally extend a length of the opposed long side segments. The U-shaped segments are angularly disposed whereby arched upper ends are disposed over a central portion of the lower frame member. A cover member is coupled over the frame member. The cover member is fabricated of a transparent canvas material. The cover member extends over the inverted U-shaped segments and is tied around the lower frame member leaving an open lower end exposed whereby the frame member can be placed over a sink. The cover member includes a front panel, a back panel, a top panel and opposed side panels. The front panel has a pair of apertures therethrough dimensioned for receiving arms of a user therethrough. The back panel has a small flapped opening therethrough at a lower corner thereof for receiving a spray hose therethrough. The top panel has a carrying handle secured thereto. One of the opposed side panels has a zippered opening therethrough to allow for passage of a fish therethrough. A pair of sleeves are secured to an outer periphery of the pair of apertures in the front panel and extend inwardly therefrom for covering the user's arms when extended through the pair of apertures. A pocket is secured to one of the opposed side panels of the cover member opposite the zippered opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish scaling net apparatus and method which has many of the advantages of the restraining nets mentioned heretofore and many novel features that result in a new fish scaling net which is not anticipated, rendered obvious, suggested, or even implied by any of the prior art restraining nets, either alone or in any combination thereof.

It is another object of the present invention to provide a new fish scaling net which may be easily and efficiently manufactured and marketed.

It is a further object of the present invention to provide a new fish scaling net which is of a durable and reliable construction.

An even further object of the present invention is to provide a new fish scaling net which is susceptible of a low cost of manufacture with regard to both materials and labor, and which accordingly is then susceptible of low prices of sale to the consuming public, thereby making such fish scaling net economically available to the buying public.

Still yet another object of the present invention is to provide a new fish scaling net which provides in the apparatuses and methods of the prior art some of the advantages thereof, while simultaneously overcoming some of the disadvantages normally associated therewith.

Still another object of the present invention is to provide a new fish scaling net for removing scales from fish with ease and without mess.

Yet another object of the present invention is to provide a new fish scaling net which includes a frame member including a lower frame member and an upper frame member. The lower frame member has a generally rectangular configuration. The lower frame member includes opposed long side segments and opposed short end segments. Free ends of the side and end segments are adjoined by corner brackets. The upper frame member includes a pair of inverted U-shaped segments. The inverted U-shaped segments each have free ends secured to the corner brackets and generally extend a length of the opposed long side segments. A cover member is coupled over the frame member. The cover member is fabricated of a transparent canvas material. The cover member extends over the inverted U-shaped segments and is tied around the lower frame member leaving an open lower end exposed whereby the frame member can be placed over a sink. The cover member includes a front panel, a back panel, a top panel and opposed side panels. The front panel has a pair of apertures therethrough dimensioned for receiving arms of a user therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a bottom plan view of the present invention.

FIG. 4 is a cross-sectional view of the present invention as taken along line 4—4 of FIG. 2.

DESCRIPTION OF THE PREFERRED EMBODIMENT

Figure 1:
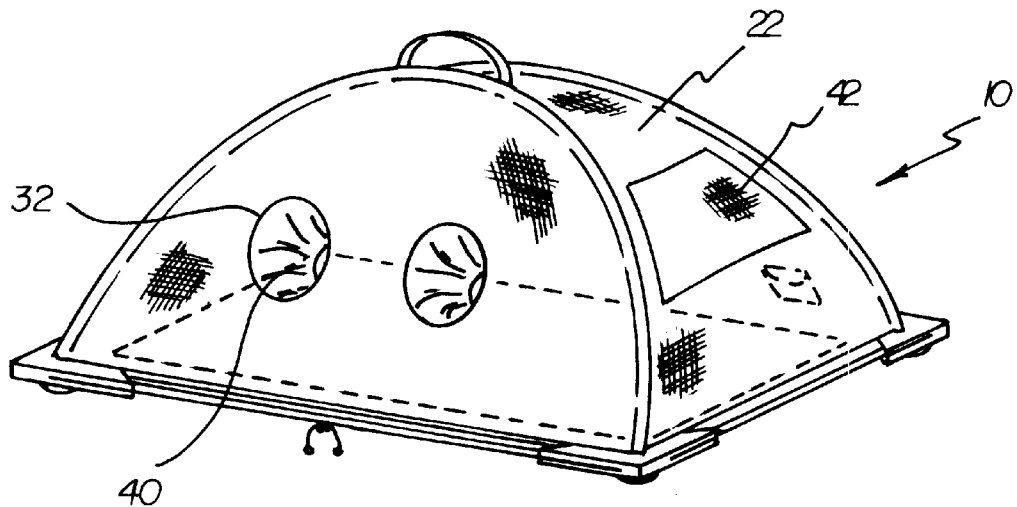
FIG. 1 is a perspective view of a new fish scaling net according to the present invention.
Figure 2:
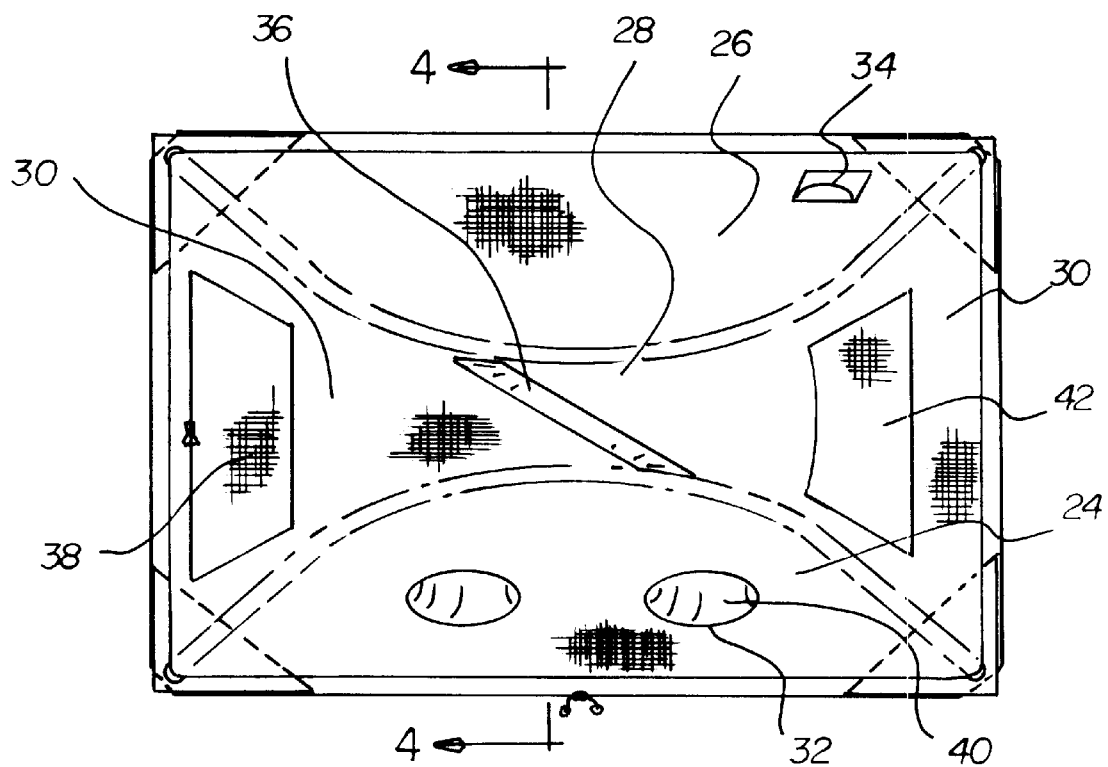
FIG. 2 is a top plan view of the present invention.

With reference now to the drawings, and in particular to FIGS. 1 through 4 thereof, a new fish scaling net embodying the principles and concepts of the present invention and generally designated by the reference numeral 10 will be described.

As best illustrated in FIGS. 1 through 4, the fish scaling net 10 comprises a frame member including a lower frame member and an upper frame member. The lower frame member has a generally rectangular configuration. The lower frame member includes opposed long side segments 12 and opposed short end segments 14. Free ends of the side 12 and end segments 14 are adjoined by corner brackets 16. The corner brackets 16 each have a suction cup 18 disposed on a lower surface thereof. The suction cups 18 will prevent the frame member from sliding when placed on a wet surface. The upper frame member includes a pair of inverted U-shaped segments 20. The inverted U-shaped segments 20 each have free ends secured to the corner brackets 16 and generally extend a length of the opposed long side segments 12. The U-shaped segments 20 are angularly disposed whereby arched upper ends are disposed over a central portion of the lower frame member. The frame member could be optionally be constructed so that it's components could be detached from one another for storage. Included in this option would be separable U-shaped segments to reduce their size and allow for easy disassembly and cleaning and storing.

A cover member 22 is coupled over the frame member. The cover member 22 is fabricated of a transparent canvas material. The cover member 22 extends over the inverted U-shaped segments 20 and is tied around the lower frame member leaving an open lower end exposed whereby the frame member can be placed over a sink. The cover member 22 includes a front panel 24, a back panel 26, a top panel 28 and opposed side panels 30. The front panel 24 has a pair of apertures 32 therethrough dimensioned for receiving arms of a user therethrough. The back panel 26 has a small flapped opening 34 therethrough at a lower corner thereof for receiving a spray hose therethrough.

The top panel 28 has a carrying handle 36 secured thereto. One of the opposed side panels 30 has a zippered opening 38 therethrough to allow for passage of a fish therethrough.

A pair of sleeves 40 are secured to an outer periphery of the pair of apertures 32 in the front panel 24 and extend inwardly therefrom for covering the user's arms when extended through the pair of apertures 32.

A pocket 42 is secured to one of the opposed side panels 30 of the cover member 22 opposite the zippered opening 38. The pocket 42 would be used to hold knives and fish scalers and other related equipment.

In use, the user would simply place the present invention over a sink or sink area. The zippered opening 38 would be opened to permit the passage of a fish therethrough. The zippered opening 38 would then be closed. The user would then place his arms through the pair of apertures 32 and into the sleeves 40 whereby his hands would be exposed interiorly of the device 10 to scale or cut the fish. Thus, scales would be confined to the inside of the device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new fish scaling net for removing scales from fish with ease and without mess comprising, in combination:

a frame member including a lower frame member and an upper frame member, the lower frame member having a generally rectangular configuration, the lower frame member including opposed long side segments and opposed short end segments, free ends of the side and end segments being adjoined by corner brackets, the corner brackets each having a suction cup disposed on a lower surface thereof, the upper frame member including a pair of inverted U-shaped segments, the inverted U-shaped segments each having free ends secured to the corner brackets and generally extending a length of the opposed long side segments, the U-shaped segments being angularly disposed whereby arched upper ends are disposed over a central portion of the lower frame member;

a cover member coupled over the frame member, the cover member being fabricated of a transparent canvas material, the cover member extending over the inverted U-shaped segments and being tied around the lower frame member leaving an open lower end exposed whereby the frame member can be placed over a sink, the cover member including a front panel, a back panel, a top panel and opposed side panels, the front panel having a pair of apertures therethrough dimensioned for receiving arms of a user therethrough, the back panel having a small flapped opening therethrough at a lower corner thereof for receiving a spray hose therethrough, the top panel having a carrying handle secured thereto, one of the opposed side panels having a zippered opening therethrough to allow for passage of a fish therethrough;

a pair of sleeves secured to an outer periphery of the pair of apertures in the front panel and extending inwardly therefrom for covering the user's arms when extended through the pair of apertures; and a pocket secured to one of the opposed side panels of the cover member opposite the zippered opening.

2. A new fish scaling net for removing scales from fish with ease and without mess comprising, in combination:

a frame member including a lower frame member and an upper frame member, the lower frame member having a generally rectangular configuration, the lower frame member including opposed long side segments and opposed short end segments, free ends of the side and end segments being adjoined by corner brackets, the upper frame member including a pair of inverted U-shaped segments, the inverted U-shaped segments each having free ends secured to the corner brackets and generally extending a length of the opposed long side segments;

a cover member coupled over the frame member, the cover member being fabricated of a transparent canvas material, the cover member extending over the inverted U-shaped segments and being tied around the lower frame member leaving an open lower end exposed whereby the frame member can be placed over a sink, the cover member including a front panel, a back panel, a top panel and opposed side panels, the front panel having a pair of apertures therethrough dimensioned for receiving arms of a user therethrough.

3. The fish scaling net as set forth in claim 2 wherein the corner brackets each have a suction cup disposed on a lower surface thereof.

4. The fish scaling net as set forth in claim 2 wherein the U-shaped segments are angularly disposed whereby arched upper ends are disposed over a central portion of the lower frame member.

5. The fish scaling net as set forth in claim 2 wherein the back panel of the cover member has a small flapped opening therethrough at a lower corner thereof for receiving a spray hose therethrough.

6. The fish scaling net as set forth in claim 2 wherein the top panel has a carrying handle secured thereto.

7. The fish scaling net as set forth in claim 2 wherein one of the opposed side panels has a zippered opening therethrough to allow for passage of a fish therethrough.

8. The fish scaling net as set forth in claim 2 and further including a pair of sleeves secured to an outer periphery of the pair of apertures in the front panel and extending inwardly therefrom for covering the user's arms when extended through the pair of apertures.

9. The fish scaling net as set forth in claim 2 and further including a pocket secured to one of the opposed side panels of the cover member.

* * * * *